United States Patent
Fifield

(10) Patent No.: US 10,328,960 B2
(45) Date of Patent: Jun. 25, 2019

(54) EXPRESS TRAIN SYSTEM

(71) Applicant: Robert W Fifield, Aptos, CA (US)

(72) Inventor: Robert W Fifield, Aptos, CA (US)

( * ) Notice: Subject to any disclaimer, the term of this patent is extended or adjusted under 35 U.S.C. 154(b) by 414 days.

(21) Appl. No.: 15/267,474

(22) Filed: Sep. 16, 2016

(65) Prior Publication Data

US 2018/0079436 A1   Mar. 22, 2018

(51) Int. Cl.
*B61B 1/02* (2006.01)
*B61D 1/00* (2006.01)
*B61G 5/00* (2006.01)
*B61L 27/00* (2006.01)

(52) U.S. Cl.
CPC ............ *B61L 27/0027* (2013.01); *B61B 1/02* (2013.01); *B61D 1/00* (2013.01); *B61L 27/0005* (2013.01); *B61L 27/0077* (2013.01); *B61G 5/00* (2013.01); *B61L 2201/00* (2013.01); *B61L 2205/00* (2013.01)

(58) Field of Classification Search
CPC ............ B61L 27/0027; B61L 27/0005; B61L 27/0077
See application file for complete search history.

(56) References Cited

U.S. PATENT DOCUMENTS

| | | | | |
|---|---|---|---|---|
| 5,575,215 | A * | 11/1996 | Egli | B61B 7/045 104/173.1 |
| 8,630,757 | B2 * | 1/2014 | Daum | B61L 3/006 701/19 |
| 2012/0085871 | A1 * | 4/2012 | Chun | B61B 1/00 246/2 S |
| 2018/0079436 | A1 * | 3/2018 | Fifield | B61L 27/0027 |

* cited by examiner

*Primary Examiner* — Jason C Smith
(74) *Attorney, Agent, or Firm* — Donald R. Boys; Central Coast Patent Agency LLC

(57) ABSTRACT

A train system has a locomotive traveling at a controlled speed on a main track, with passenger cars capable of locomotion and of automatic coupling and decoupling, forming a train on the main track. Appropriate passenger cars are decoupled and switched onto a side track at stations to unload passengers while the rest of the train passes the stations without stopping. Passenger cars loaded with passengers at these stations are then deployed to couple-up with the train after it has passed the station. This combines local service with express service. Operation in most cases is guided by a central computer system.

10 Claims, 16 Drawing Sheets

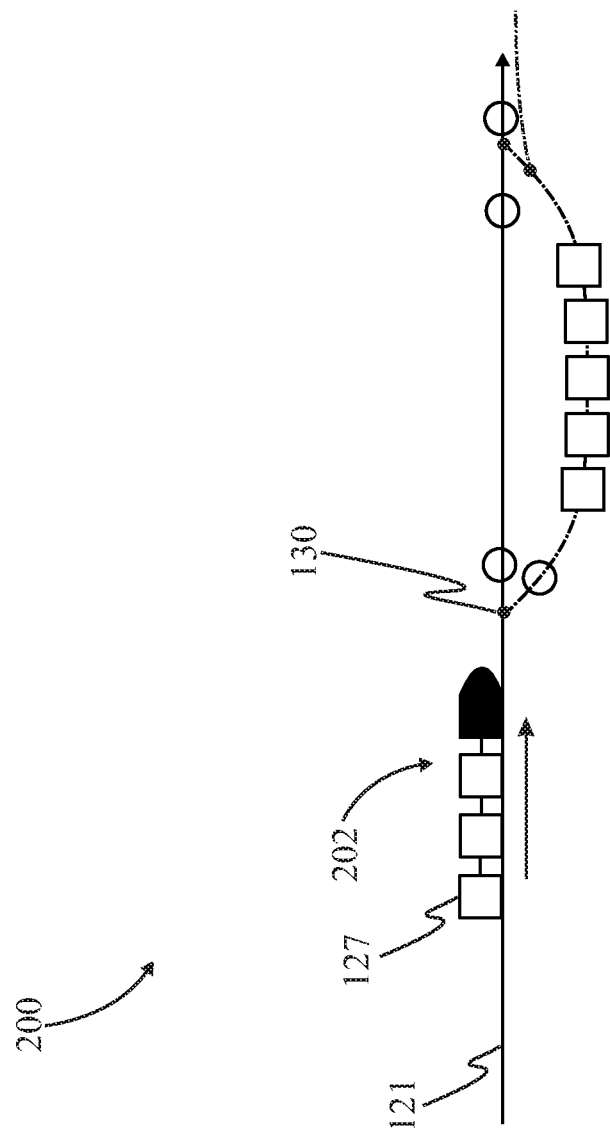

EXPRESS TRAIN SYSTEM

BACKGROUND OF THE INVENTION

1. Field of the Invention

The present invention is in the field of train systems. More specifically, in the area of rapid transit.

2. Description of Related Art

In the field of rapid transit systems, there have been many innovations on the technology side. The very first locomotives were powered by steam. Then came the gas and diesel locomotives. Then came electric motor locomotives. Today, there are systems that run using various types of magnetic propulsion. Regardless of all the innovation, and increases in speed capabilities, many problems remain.

Scheduling systems used today may have set times for each stop, so that commuters know when they should be at a certain location. This may be an important factor, especially when there are infrequent stops made by the trains. A set schedule may also result in time that may be considered wasted if there are infrequent passengers getting off or on at that particular stop. With the help of history and records of ridership gathered from various forms of public transportation, the number of stops at less active locations are decreased. Fewer stops may result in a shorter time between an origin and destination. However, this creates another problem—fewer stops may lead to faster travel time overall, but it may be an inconvenience to people who depend on public transportation and are required to commute from less popular areas. This may lead to people deciding not to use public transportation at all, and, instead, decide to use personal transportation out of convenience.

Therefore, what is clearly needed is a system that doesn't adhere entirely to the old scheduling system, while allowing for more stops, with little or no time penalties for additional stops.

BRIEF SUMMARY OF THE INVENTION

In one embodiment of the invention a train system is provided, comprising a first main track, passing each one of a plurality of geographically-separated passenger stations in a sequential order, a locomotive traveling at a controlled, pre-determined speed on the first main track, a plurality of passenger cars, each capable of individual locomotion and of automatic coupling and decoupling to other passenger cars and to the locomotive, each having passages that may be opened to allow passengers to move from car to car, and that may be closed to prevent passengers from moving from car to car, a portion of the plurality of passenger cars coupled to one another and to the locomotive, forming a train moving at the controlled, pre-determined speed on the first main track, side tracks at each passenger station joined to the main track by a first remotely-operable switch before and by a second remotely-operable switch after the associated passenger station, the side tracks each having a load/unload region at the associated passenger station, and a central computer system tracking the locomotive and all passenger cars, remotely switching the first and second remotely-operable switches at each passenger station, and managing locomotion of each passenger car while decoupled from the train. The central computer system operates the first and second switches of a side track at a passenger station, decouples a last car of each train ahead of each passenger station and operates the first remotely operable switch to shunt the decoupled car onto the side track, resets the first switch after the decoupled car is on the side track, closes and accelerates a newly-loaded car from the load/unload region onto the main track after the train has passed the second switch, by operating the second switch, manages locomotion of the newly loaded car to join the train by coupling to the last car of the train, and manages locomotion of the decoupled car to decelerate gradually and stop at the load/unload station.

In one embodiment the train system further comprises a series of sensors located both on the main track both before and after the station, and at various points on the side track, the sensors noting position of trains and cars, and transmitting information to the central computer system. Also in one embodiment the first main track makes a loop, passing each of the plurality of separated passenger stations in the loop, and repeating the loop. Also in one embodiment the two main tracks make a loop within a loop, with each main track having a side track at each passenger station. In one embodiment the main computer system manages passenger guidance displayed both inside and outside each passenger car, depending upon the position and deployment of each car.

In one embodiment passengers are guided by announcements and displays inside cars coupled to a moving train to move to correct cars designated for arrival at the station of their desired destinations. Also in one embodiment cars designated as arriving cars for an approaching station are closed to passenger movement between cars at some pre-determined distance from the arriving station. Also in one embodiment passengers at a station are guided by displays on cars designated for departure and by announcements of what cars to enter and at what time. In one embodiment cars designated for departure are closed for passenger entry at a pre-determined time based on position of a train passing the station on the main track. And in one embodiment a fail-safe switch is positioned on the side track between the station loading platform and the switch entering the main track, and the fail-safe switch switches a departing car onto a fail-safe track to be safely decelerated in the event that a train has not passed the station at a pre-determined time.

In another aspect of the invention a method is provided, comprising decoupling a car carrying passengers destined for a passenger station, at the end of a train running on a main track at a controlled speed past the passenger station, before a first side-track switch ahead of the passenger station, operating the first side-track switch after the train has passed the first side-track switch to shunt the decoupled car that has not yet arrived at the side-track switch, onto a side track, resetting the side track switch after the decoupled car is on the side track, decelerating the decoupled car to stop at a platform along the side track at the station, to open and allow passengers in the car to depart, accelerating a car having passengers loaded at the platform and destined for other stations, along the side track away from the platform toward the main track while the train passes the station on the main track, operating a second side-track switch after the train has passed the station and cleared the second side track switch, to allow the accelerating car leaving the station to enter the main track behind the passing train, resetting the second side track switch after the accelerating car has entered the main track behind the train, and coupling the accelerating car to the end of the train as it reaches the last car of the train.

In one embodiment of the method switches are operated and decoupled cars are accelerated and decelerated, and coupling and decoupling is accomplished under control of one or both of a central computer system and on-board computers on the cars, in communication with the central computer system. Also in one embodiment control by the main computer system is accomplished with signals from sensors along the main track and the side track, both before and after the station, and at various points on the side track, the sensors noting position of trains and cars, and transmitting information to the central computer system. Also in one embodiment the passenger station is one of a plurality of passenger stations on the first main track, which makes a loop, passing each of the plurality of passenger stations in the loop, and repeating the loop. And in one embodiment there are two main tracks making a loop within a loop, with each main track having a side track at each passenger station.

In one embodiment of the method the main computer system manages passenger guidance displayed both inside and outside each passenger car, depending upon the position and deployment of each car. Also in one embodiment passengers are guided by announcements and displays inside cars coupled to a moving train to move to correct cars designated for arrival at the station of their desired destinations. Also in one embodiment cars designated as arriving cars for an approaching station are closed to passenger movement between cars at some predetermined distance from the arriving station. In one embodiment passengers at a station are guided by displays on cars designated for departure and by announcements what cars to enter and at what time. And in one embodiment cars designated for departure are closed for passenger entry at a pre-determined time based on position of a train passing the station on the main track.

BRIEF DESCRIPTION OF THE SEVERAL VIEWS OF THE DRAWINGS

FIG. 2A is an illustration showing a train having an engine and three cars approaching a station.

DETAILED DESCRIPTION OF THE INVENTION

Figure 1A:
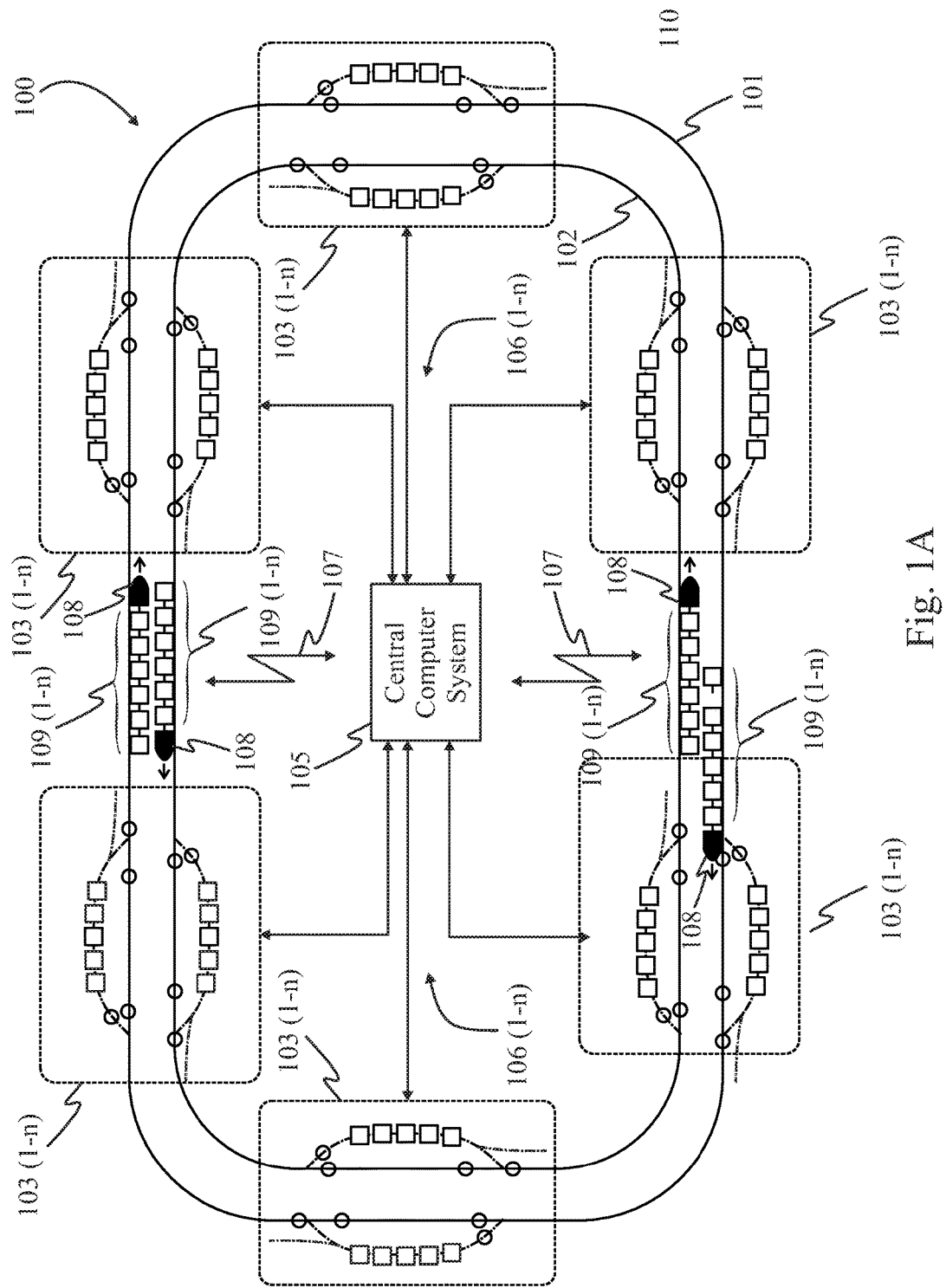
FIG. 1A is an overview diagram according to one embodiment of the present invention.

FIG. 1A shows an overview of a train system 100 according to one embodiment of the present invention. This embodiment shows a train system 100 that utilizes two main tracks 101 and 102, but it is possible to create a system which utilizes any number of main tracks, including, but not limited to, a system that uses one main track with a well-planned series of rail switches to ensure safe operation. Each set of tracks 101 and 102 in train system 100 in this example is dedicated to a single direction for a plurality of trains running concurrently, and each set of tracks 101 and 102 are divided into segments, known as blocks in the art. In embodiments of the invention trains travel at a controlled speed on the main tracks, and do not stop at passenger stations, although there may be accommodations in the system to take trains out of operation for service or repairs. Passengers and freight are added to train, and subtracted from a train, by switching individual cars on and off the main tracks at load/unload stations, and coupling and decoupling the cars as needed.

Trains may include, but are not limited to, a locomotive 108, and one or more passenger cars 109. Some embodiments may utilize semi-permanent cars attached to locomotive 108 which may include, but are not limited to, a dining car, and a passenger car that does not automatically decouple, as do most passenger cars, as described in detail below. Locomotive 108 and passenger car 109 will be explained in further detail with reference to FIGS. 3, 4A, and 4B. It should be understood the locomotive 108 may be any sort of drive locomotive that is known in the art, and that in some circumstances, cars may be self-driven, and no separate locomotive may be needed.

Train system 100 has a plurality of stations 103(1-n), which are described in further detail with reference to FIG. 1C, and elsewhere in the specification. Stations 103(1-n) may be connected to a central computer system 105 via connections 106(1-n). Connections 106(1-n) may be, but are not limited to, a hardwired Ethernet connection, or a wireless broadcast. The central computer system also communicates over Wireless connection 107(1-n) to and from vehicles that include, but are not limited to, locomotives, passenger cars, and other semi-permanently attached cars. The data being transmitted may be encrypted to prevent unauthorized access, and may use any communications protocol commonly known in the art. The central computer system 105 may automatically control many aspects of the system, including, but not limited to, braking and acceleration of trains, locomotives, and passenger cars; controlling rail switching; track positioning, data relating to trains, locomotives, and passenger cars; and handling and issuing of emergency alerts.

Although no sidings, depots, or any other structures commonly found in a modern train system are shown in this embodiment, it is understood that these structures are not precluded from being implemented in a system without diverging from the core concept and scope of the present invention.

Figure 1B:
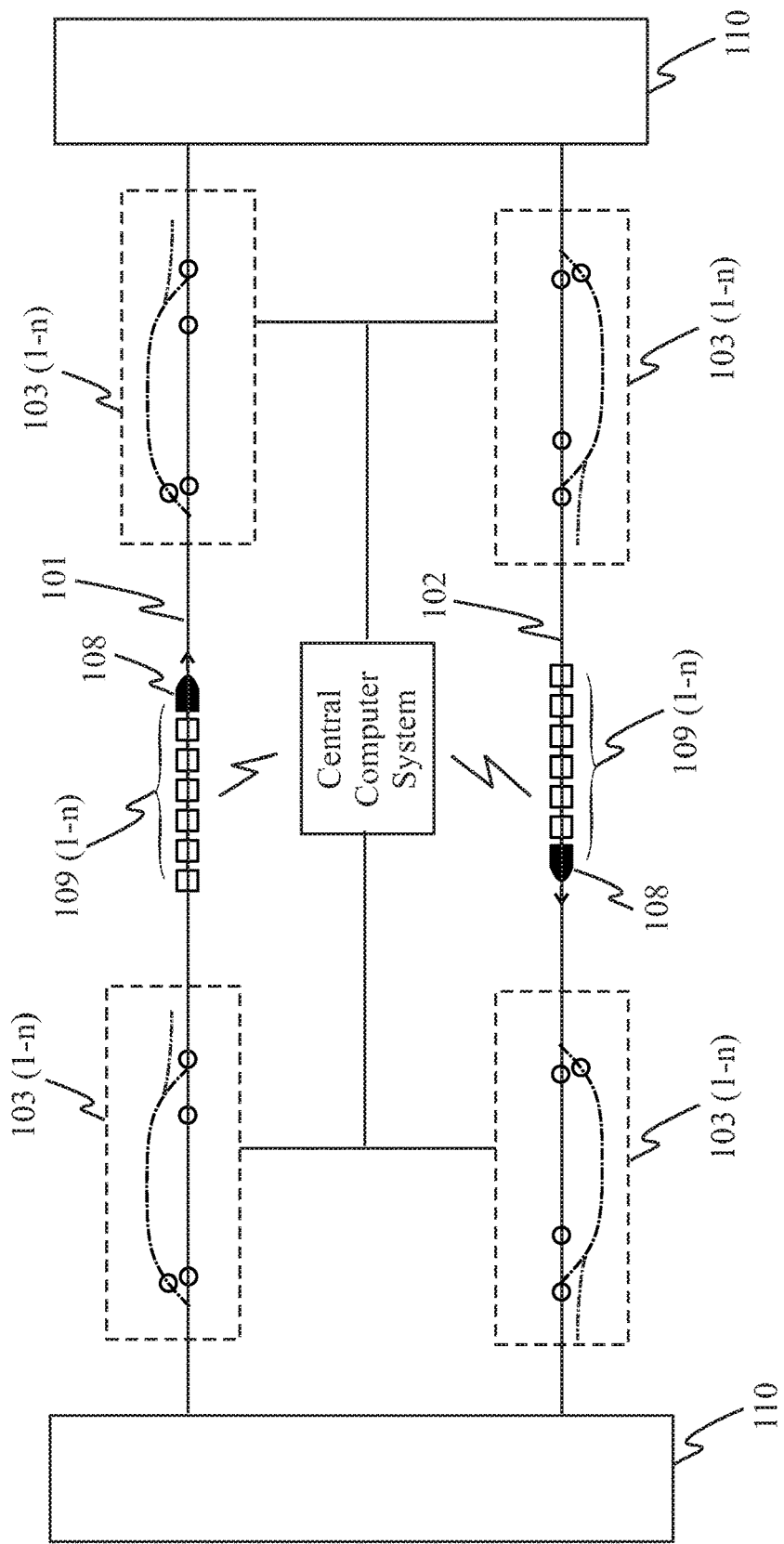
FIG. 1B is an overview diagram according to another embodiment of the present invention.

This concept may be implemented on a variety of configurations. Configurations could include one long run with the loop at both ends that would result in trains re-encountering stations in a different order than a simple circular arrangement. In some arrangements, a loop may not even be necessary at both ends. The trains could actually regularly come to a complete stop at either or both ends with the "non-stop" aspect implemented at the stations in-between. FIG. 1B is an overview of an embodiment of the present invention showing a non-circular configuration that may result in trains regularly coming to a complete stop at both ends. This allows for a train that does not necessarily have to be electric. In this embodiment, while the main core train may not stop at stations in the middle of the configuration, passenger cars may be deployed to and from any station as needed. There are two main tracks shown, labeled 101 and 102, as in FIG. 1A. The end areas 110 may be turn-around facilities combined with service and maintenance services.

Almost any mix of a variety of types of configurations and full stops (at ends of routes) may be possible to provide an express route for all. By strategic placing of rail switches, train systems can interleave via the passenger car queue (128) or even the main tracks to further expand the possibility of non-stop direct routes.

Figure 1C:
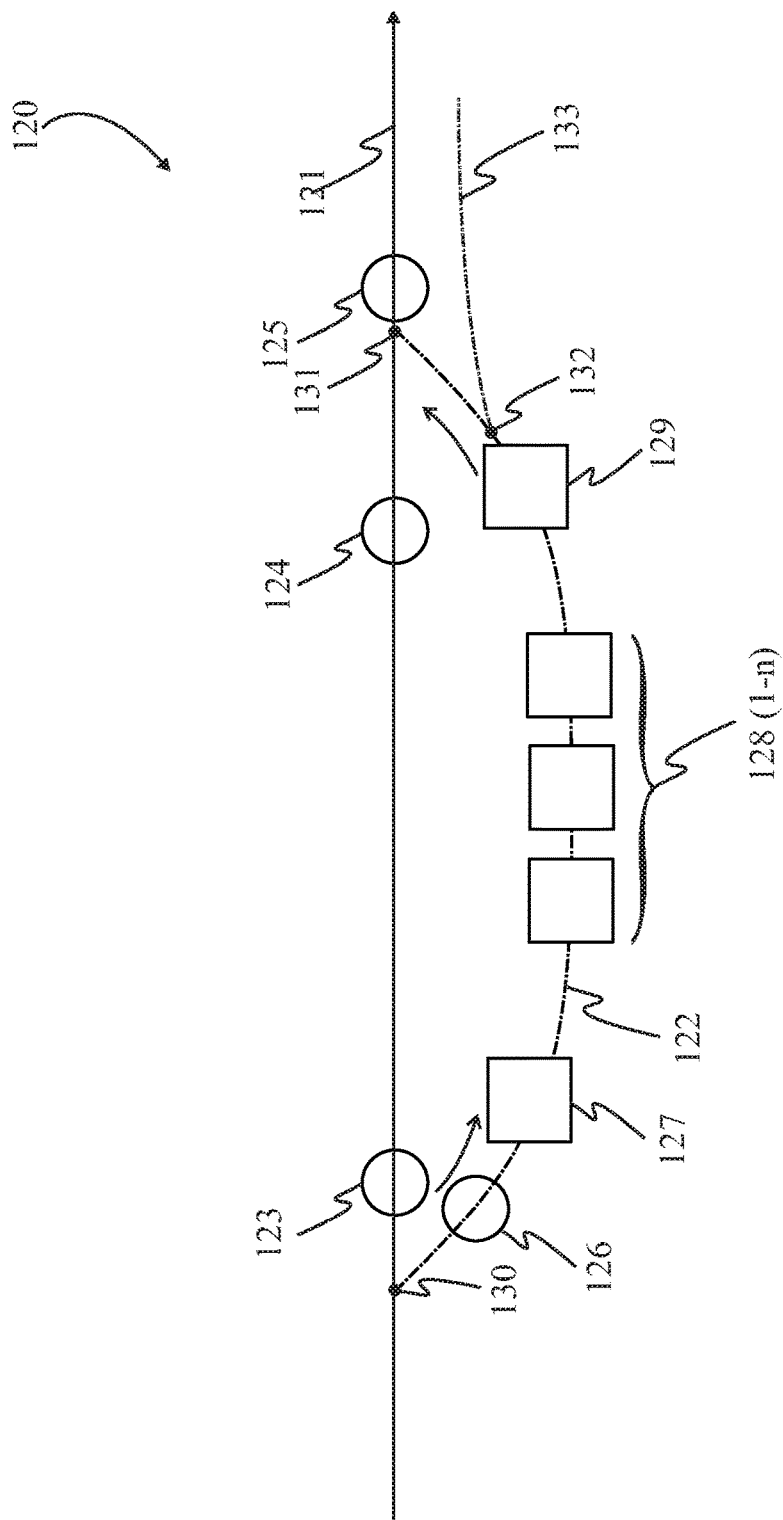
FIG. 1C is an expanded view of a station shown in FIGS. 1A and 1B according to one embodiment of the current invention.

FIG. 1C is an expanded view of a station 120 that is one side of a station that was presented in plurality in FIGS. 1A and 1B as element number 103(1-n). In this embodiment the top and bottom halves depicted in 103(1-n) are functionally identical. In this regard, only components from half of station 103(1-n) are expanded upon. Station 120 may have a main track 121 that passes through the station, analogous to one of main tracks 101 or 102 of FIGS. 1A and 1B. There may also be a series of sensors, including a first main track sensor 123, a second main track sensor 124, and a third main track sensor 125, in place along main track 121. Additionally, a side track 122 may have a side track sensor 126. These sensors (123, 124, 125, and 126) may be used for operations that may require a more precise standard of timing than with a tracking system. Sensors 123, 124, 125, and 126 may utilize any form of sensing including, but not limited to, proximity sensor, infrared sensor, motion sensor, radar, or sonar.

In addition to main track 121, each station 120 may have a side track 122 that may be accessible via a first railway switch 130. Side track 122 may lead to a station platform where an arriving passenger car 127 may unload passengers or packages. In some embodiments, there may be a train and platform dedicated for delivery of packages or other freight. Each station 120 may have a number of passenger cars 128(1-n) available for loading of passengers or packages. When a departing passenger car 129 is ready to be deployed to join a passing train it may be accelerated along side track 122 away from the loading platform to get back onto main track 121 through switching of a second railway switch 131. Optionally, to allow a switchless merge, a type of automatic-merging may be possible without the need for switch 131. The steps for this process are described below in FIGS. 2A-2F.

In the event of a system failure, a fail-safe railway switch 132 will route the deploying passenger car 129 onto a fail-safe track 133, where the departing passenger car 129 may be safely and comfortably decelerated. This illustration depicts only 5 passenger cars being utilized for each half, but it should be understood that the only limit that pertains to the number of cars that may be deployed, on standby for loading, and arriving may be space allotted to each station.

Any number of these station modules (120) may be inserted along train routes without impacting express times. It would be possible for such stations to be conveniently positioned every mile along a train route without slowing down any express routing.

The system in this embodiment will make use of a hybrid system in which the main tracks provide a source of voltage powering an electric locomotive, and side track 122 may use an electromagnetic rail system to provide locomotion to passenger cars 109(1-n) without needing to equip each passenger car with its own engine or motors, although in some embodiments the passenger cars may indeed be self-powered in any way known in the art. There may also be an embodiment in which main tracks are on a different ground elevation from platforms found in station 120. For instance, main tracks may be underground, and station 120 may be above ground. (While man-made braking and propulsion systems may fail, this arrangement guarantees infallible gravitational forces that will help slow-down incoming rail cars and help speed-up outgoing cars.) It should be understood that any combination of train systems may be used without diverging from the teachings of the inventive concept of the present invention.

Figure 2B:
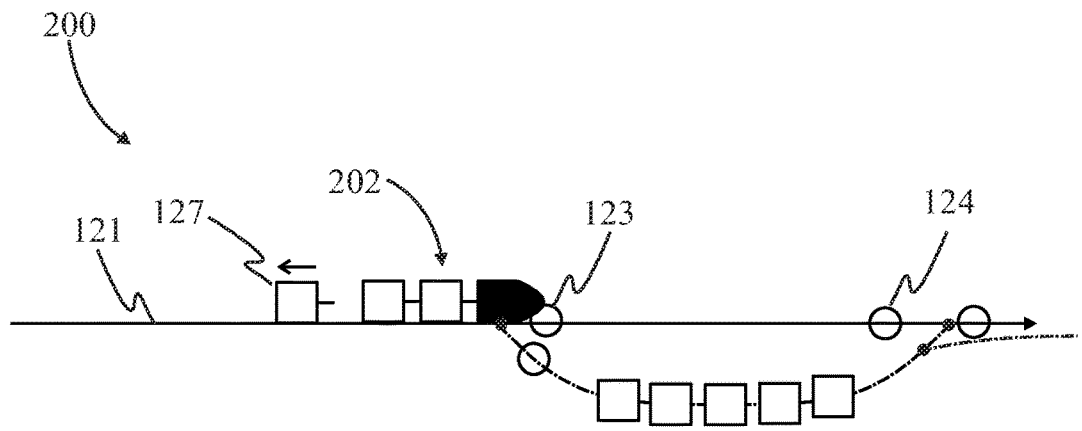
FIG. 2B is an illustration demonstrating what occurs as the train of FIG. 2A reaches a first main track sensor according to one embodiment of the present invention.

FIG. 2A is an illustration showing a train 202 having three cars approaching a station on a main track 121. FIGS. 2B to 2G are stop-motion examples of the steps that may occur as the train travels past the station on a main track. In FIG. 2B a train 202 travels by a main track 121 and reaches and triggers a first main track sensor 123 at a station 200. Train 202 at that point receives instructions from central computer system 105 to decouple any passenger cars, necessarily at the rear of the train, predesignated as an arriving car 127. This particular example shows one car 127 decoupling as train 202 reaches a first main track sensor 123, but it should be understood that more cars may be decoupled depending on the number of passengers that intend to stop at this station 200. Another passenger car may become designated as an arriving car if the current passenger car cannot accommodate the number of passengers scheduled for arrival at the station. In this case, an onboard computer system may report the status to the central computer system 105 and the next car up may also become designated as an arriving car.

Figure 2C:
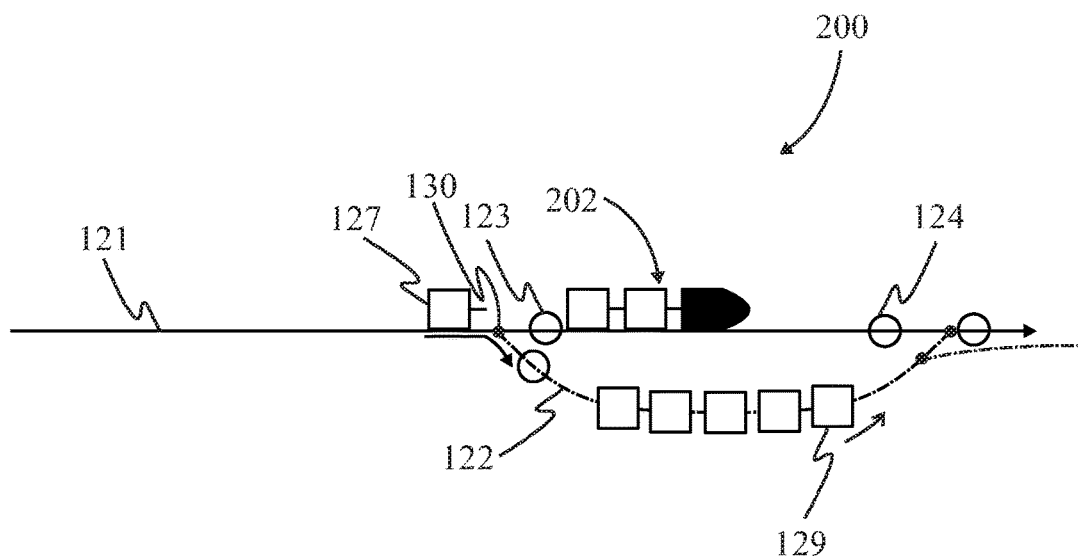
FIG. 2C is an illustration demonstrating what occurs as a train clears a first main track sensor according to one embodiment of the present invention.

In FIG. 2C train 202 clears first main track sensor 123 and a first railway switch 130 is positioned by control of central computer system 105 to allow arriving passenger car 127 to travel off of main track 121 and onto side track 122 that leads to a passenger platform. Side track 122 in this embodiment uses an electromagnetic rail system to provide locomotion as well as slowing and stopping power for any passenger cars that happen to be on side track 122. Side track 122 begins decelerating arriving passenger car 127 as soon as it enters side track 122. Train 202 keeps traveling on the main track 121 at its controlled speed without stopping. In one embodiment, a departing passenger car 129 predesignated to deploy from station 200 begins to accelerate by the electromagnetic rail system of side track 122 when the train clears the first main track sensor 123. In another embodiment, deployment of passenger car 129 is held off until the train clears the second main track sensor 124.

Figure 2D:
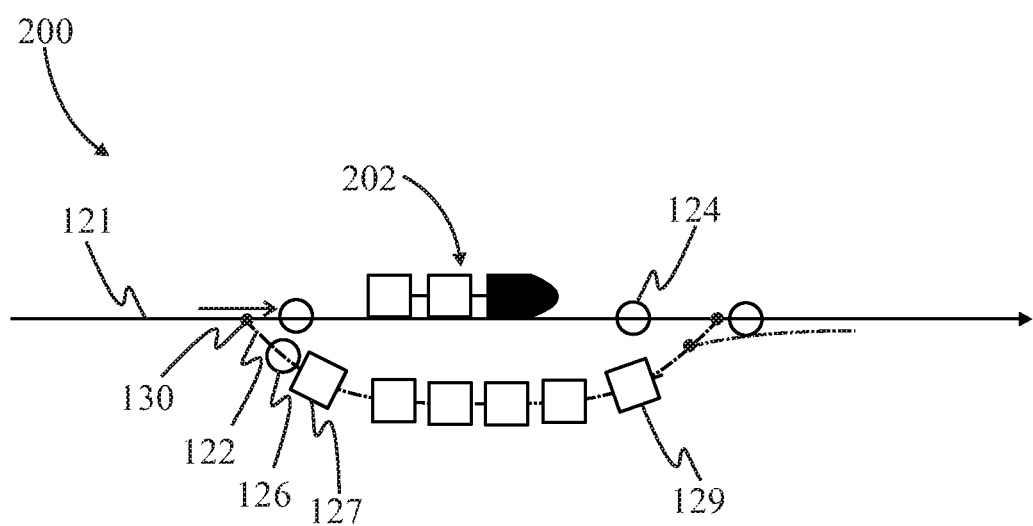
FIG. 2D is an illustration demonstrating what occurs as an arriving passenger car clears a side track sensor according to one embodiment of the current invention.
Figure 2E:
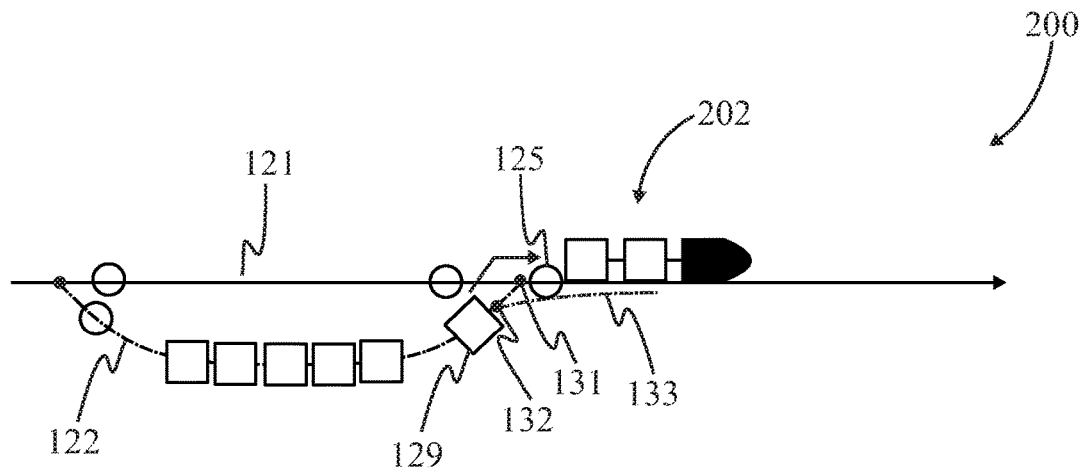
FIG. 2E is an illustration demonstrating what occurs as a train clears a third main track sensor according to one embodiment of the present invention.

In FIG. 2D decoupled passenger car 127 clears a side track sensor 126, which causes railway switch 130 to reset into a position to allow a next train to pass. Arriving passenger car 127 continues to be decelerated by the electromagnetic rail system until it reaches a complete stop behind any other cars at the station that will be automatically moved forward as necessary to make room for the arriving car. When it is safe to do so, doors may open to allow passengers to get off of arriving passenger car 127. In FIG. 2E train 202 clears a third main track sensor 125, and as a result a second railway switch 131 and a fail-safe switch 132 are switched to allow the departing passenger car 129 to leave side track 122 and to enter main track 121. In a fail scenario, such as a case where the train 202 doesn't clear the third main track sensor 125 in time, departing passenger car 129 may not enter the main track, and may be directed to a fail-safe track 133 where departing passenger car 129 may be safely and comfortably decelerated by the electromagnetic rail system and allow passengers to be evacuated.

Figure 2F:
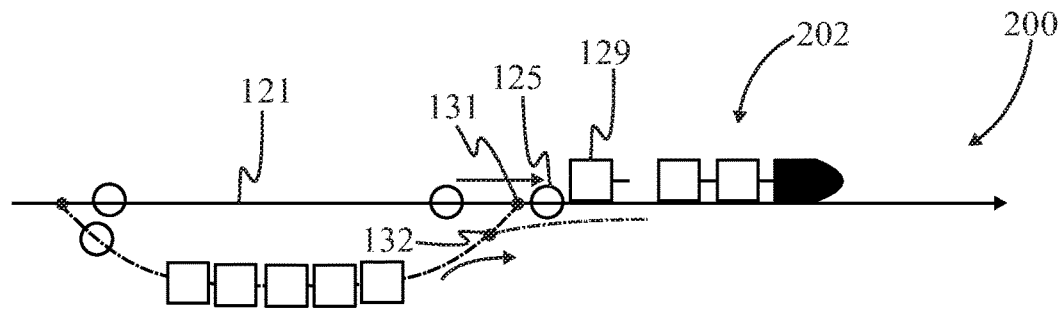
FIG. 2F is an illustration demonstrating what occurs as a departing passenger car exits a side track and clears a third main track sensor according to one embodiment of the present invention.
Figure 2G:
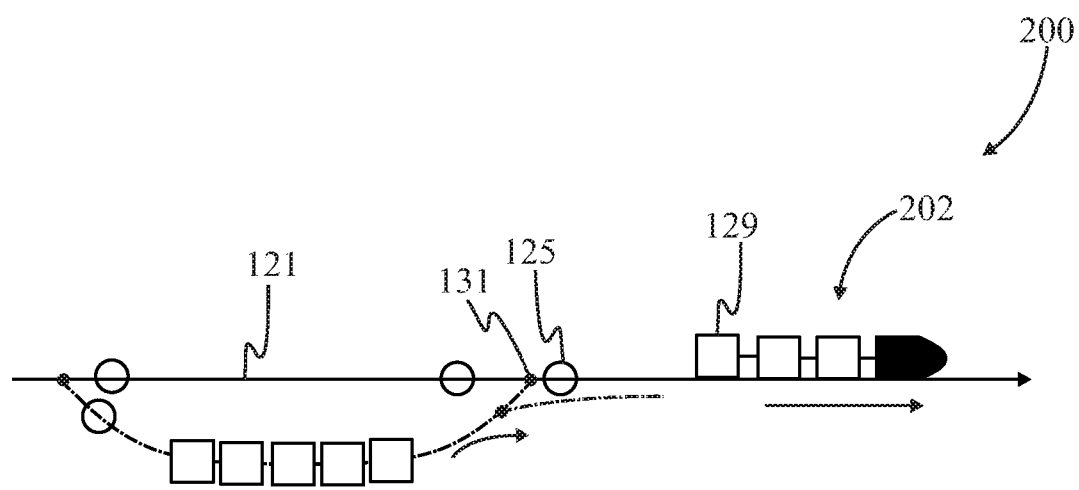
FIG. 2G shows train 202 with car 129 joined to the train, with the train traveling away from the station.

In FIG. 2F departing passenger car 129 successfully makes it onto main track 121 and clears the third main track sensor 125. This puts fail-safe switch 132 and second railway switch 131 back into position to handle the fail scenario, and to keep train traffic on main track 121. At some point, departing passenger car 129 has built up enough speed from the electromagnetic propulsion system to catch up to train 202. Once departing passenger car 129 reaches train 202, it automatically couples with train 202. Once a solid connection is confirmed by an onboard computer system, passengers are allowed to move freely to and from the now attached departing passenger car 129. FIG. 2G shows train 202 with car 129 joined to the train, with the train traveling away from the station.

Figure 3:
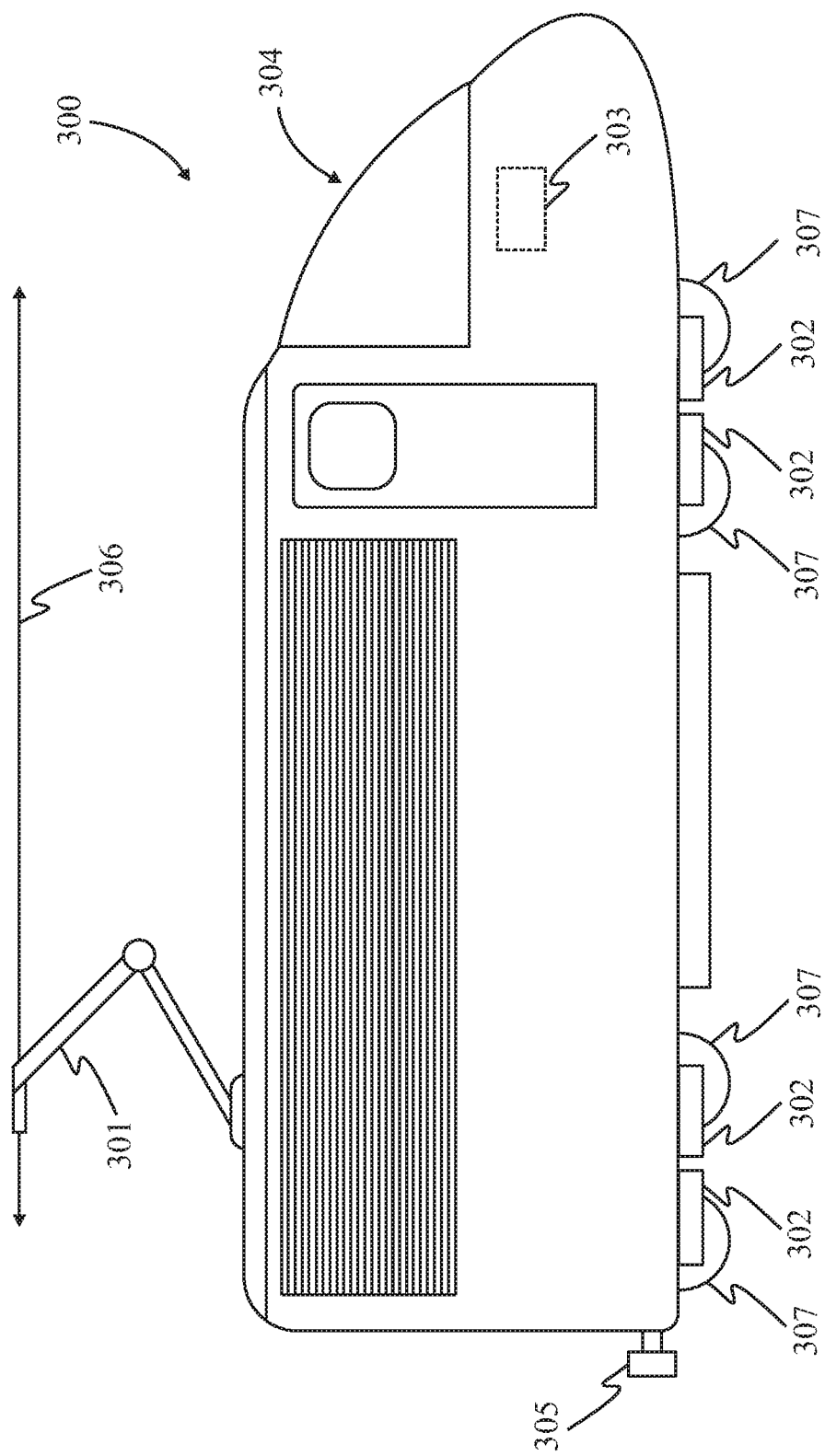
FIG. 3 is a side view of an electric locomotive that may be used in various embodiments of the present invention.

FIG. 3 shows an example of an electric locomotive 300 that may be used to implement various embodiments of the present invention. Electric locomotive 300 may have a pantograph 301 mounted on the roof in order to receive power from an overhead powerline 306. Powerline 306 is commonly implemented in an electric rail system, and may be present over the entire lengths of the main tracks. Alternatively, power may be received from the undercarriage over a powered "third rail" system that may be present over the entire lengths of the main tracks, or from rails through the wheels, for example. The power received by pantograph 301 or the powered rail or rails is passed through an internal system of electronic components to power traction motors 302. Traction motors 302 provide torque to wheels 307 to move the train along a track.

Each locomotive may have a driver cab 304, where a conductor may reside during operation of the electric locomotive 300. The driver cab 304 may have an onboard computer system 303, previously described, and its functions may include, but are not limited to, automatically keeping track of the status of various components of the locomotive, controlling emergency systems in the case of system failure, and sending and receiving status updates for passenger data and passenger cars that may connect and disconnect throughout the operation of this embodiment of the present invention. Computer system 303 may allow a conductor to engage certain functions manually if a circumstance in which it is necessary arises.

Electric locomotive 300 may also have a coupler 305 with fully automatic capabilities. In some embodiments, cars that are semi-permanent fixtures in a train may be used. In such cases, coupler 305 may not necessarily be a fully-automatic coupler.

Figure 4A:
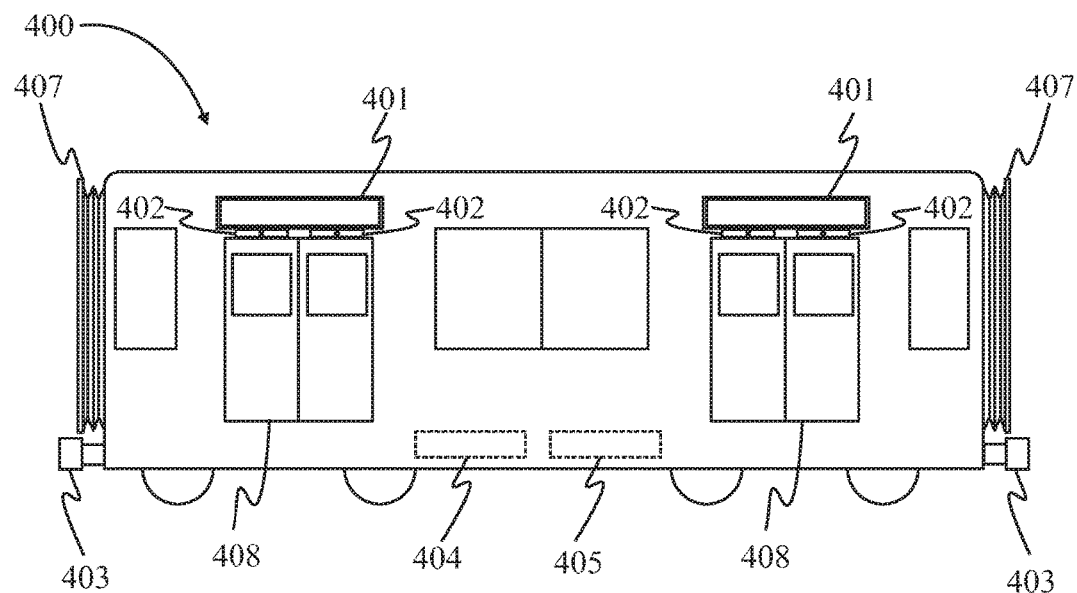
FIG. 4A is a side view of a passenger car that may be used in various embodiments of the present invention.

FIG. 4A is an illustration of an example passenger car 400 that may be used in various embodiments of the present invention. Passenger car 400 may have one or more doors 408 to allow passengers to enter or leave passenger car 400. This illustration only shows two sets of doors, but more or fewer doors may be used. Each set of doors 408 may have an exterior electronic sign 401 installed overhead, along with an automatic passenger counter (APC) system 402. Electronic sign 401 may be used to display information including, but not limited to, countdown until the passenger car 400 departs, or closing of doors, using data gathered by APC system 402, to display the number of passengers that are currently onboard the passenger car 400, whether the passenger car is available for boarding, and current designation status. Passenger car 400 may have a diaphragm 407 in place at both ends to create a weatherproof seal after being coupled with other passenger cars, so that passengers may comfortably move from one passenger car to another regardless of weather conditions.

Passenger car 400 may have a battery 404 to power electronics onboard, including, but not limited to, interior signage, exterior signage, emergency braking systems, and an onboard computer 405. Onboard computer 405 may be responsible for, but is not limited to, automatically sending and receiving status updates to the central computer system, receiving instructions from the central computer system or onboard computer systems of other cars, control of doors on passenger car 400, and adjusting displays installed in the interior to present relevant information to onboard passengers.

Figure 4B:
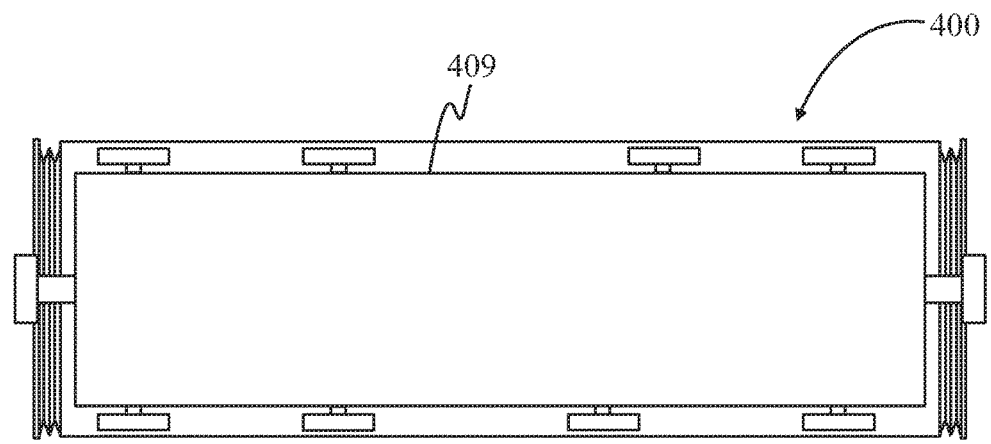
FIG. 4B is a view of the underside of a passenger car that may be used in various embodiments of the present invention.

FIG. 4B is an illustration of the underside of passenger car 400 according to one embodiment. Passenger car 400 may have a ferromagnetic plate 409 securely attached to provide enough magnetic polarity to interact with an electromagnetic rail system. The operation described above regarding one station, one side track and one train on one main track is meant to describe the operation at any of the plurality of stations regardless of the number of main tracks, trains, directions, and so forth.

Figure 5:
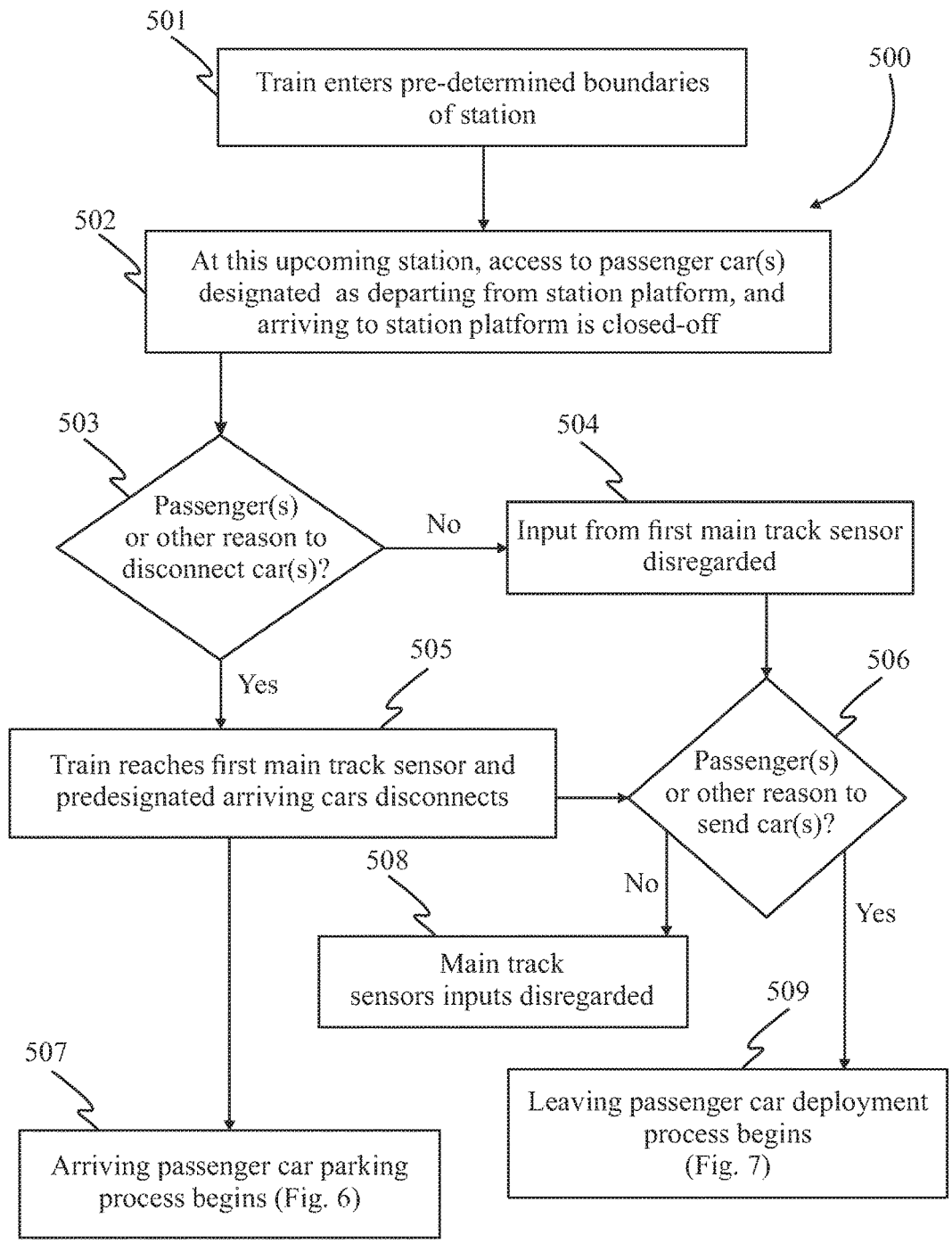
FIG. 5 is a flowchart that outlines the operation of an express train system from the perspective of a train currently traveling on a main track according to one embodiment of the present invention.

FIG. 5 is a flowchart of a method 500 that outlines the operation of an express train system from the perspective of a train currently traveling on a main track according to one embodiment of the present invention. At step 501, the train enters a pre-determined boundary for an upcoming station. This boundary may be determined in a variety of ways, including, but not limited to, a measure of time, a geo-fence, and any method used in the art to determine presence of a train on a segment of track, such as a block system. At step 502, access to one or more predesignated arriving passenger cars, at the end of the train, is closed off, and passengers, who have been previously directed to this car as designated for their destination station, are instructed to be seated, or secure their positions to prepare for stopping. Access to one or more predesignated departing cars waiting at the upcoming station platform is also closed off. This may occur after a pre-determined timespan after entering the station boundaries, so that passengers may have time to move to a correct passenger car. There may be another period of time from when access is closed off to the beginning of step 503 in order to allow passengers to secure themselves. At step 503, if no passengers are reported to be onboard any predesignated arriving passenger car and a need has not arisen to replenish pending outgoing passenger cars (i.e. 128) at the upcoming stations, step 504 occurs. At step 504 any input from the first main track sensor is disregarded. Returning to step 503, if there are passengers on board one or more designated arriving passenger cars or a need has arisen to transfer passenger cars to upcoming stations, step 505 occurs. At step 505, the train reaches a first main track sensor. Passenger cars that have been designated as arriving cars, automatically decouple from the train. At step 507, one or more arriving passenger cars begin a parking process which is described below with reference to FIG. 6 in a method 600. At step 506, if no passengers are reported to be onboard any of the designated departing cars and it is determined that cars do not need to be sent from this station to another station, step 508 occurs. At step 508, input from the second and third main track sensors are disregarded. Returning to step 506, if there are passengers onboard one or more predesignated departing passenger cars or it is determined that cars need to be sent from this station to another station (passenger car queue 128 approaching full capacity or request of pending shortage of passenger cars from other stations, among others are possibilities), step 509 occurs. At step 509, a departing passenger car deployment process begins which is described below in FIG. 7 in a method 700.

Figure 6:
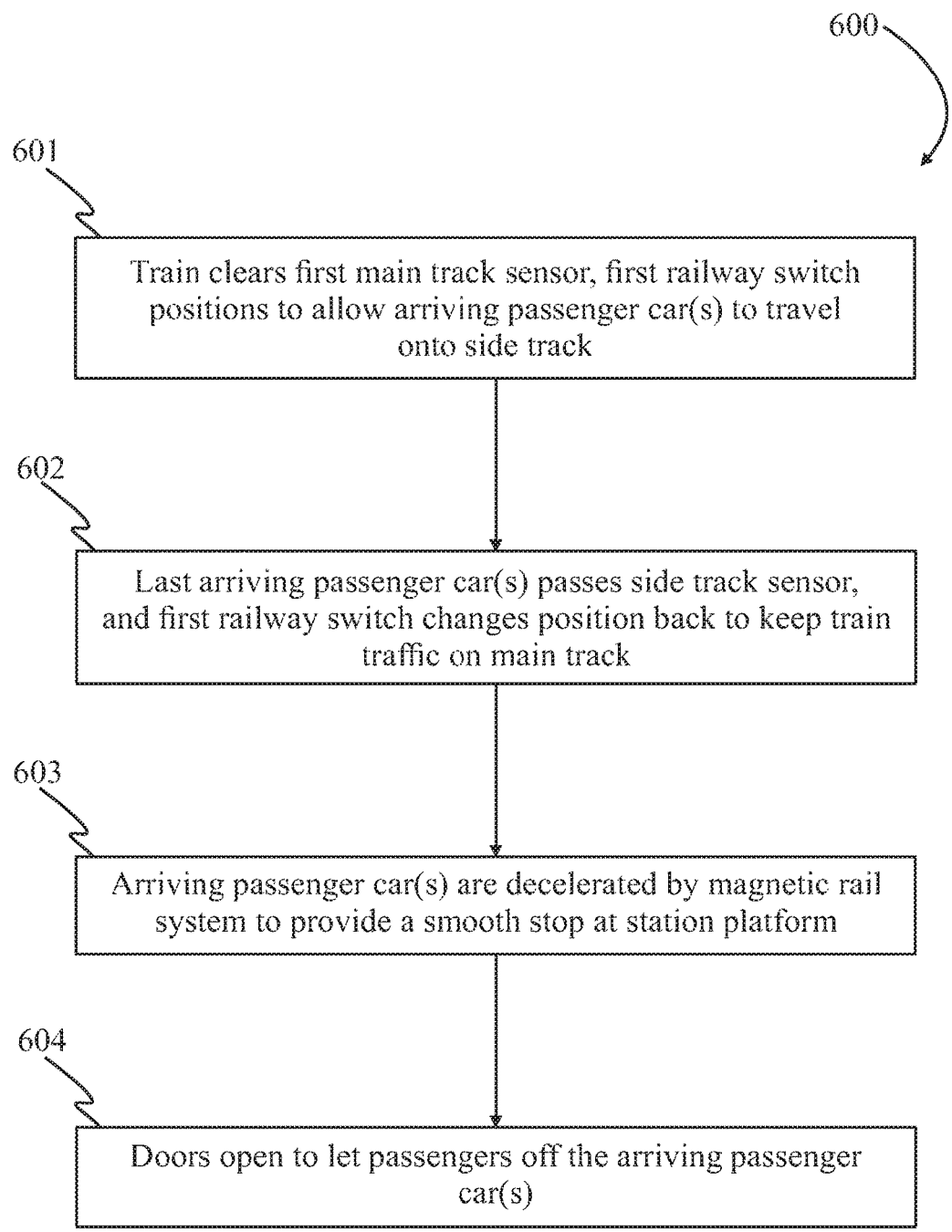
FIG. 6 is a flowchart that outlines an arriving car parking process according to one embodiment of the present invention.

FIG. 6 is a flowchart of a method 600 that describes an arriving car parking process according to one embodiment of the present invention. At step 601, the train clears the first main track sensor, in other words, all currently connected cars and locomotive have passed the first main track sensor, and a first railway switch (130) positions to guide one or more arriving cars (127) onto a side track (122). At step 602 the one or more arriving cars clears a side track sensor and the first railway switch changes back to its previous position to keep further train traffic on the main track. At step 603, arriving passenger cars are gradually, and comfortably decelerated by the electromagnetic rail system, until they come to a full stop. At this point, the one or more arriving cars receive a signal from a central computer system to allow unloading of passengers. At step 604, doors open on the one or more arriving passenger cars, allowing passengers to get off.

Figure 7:
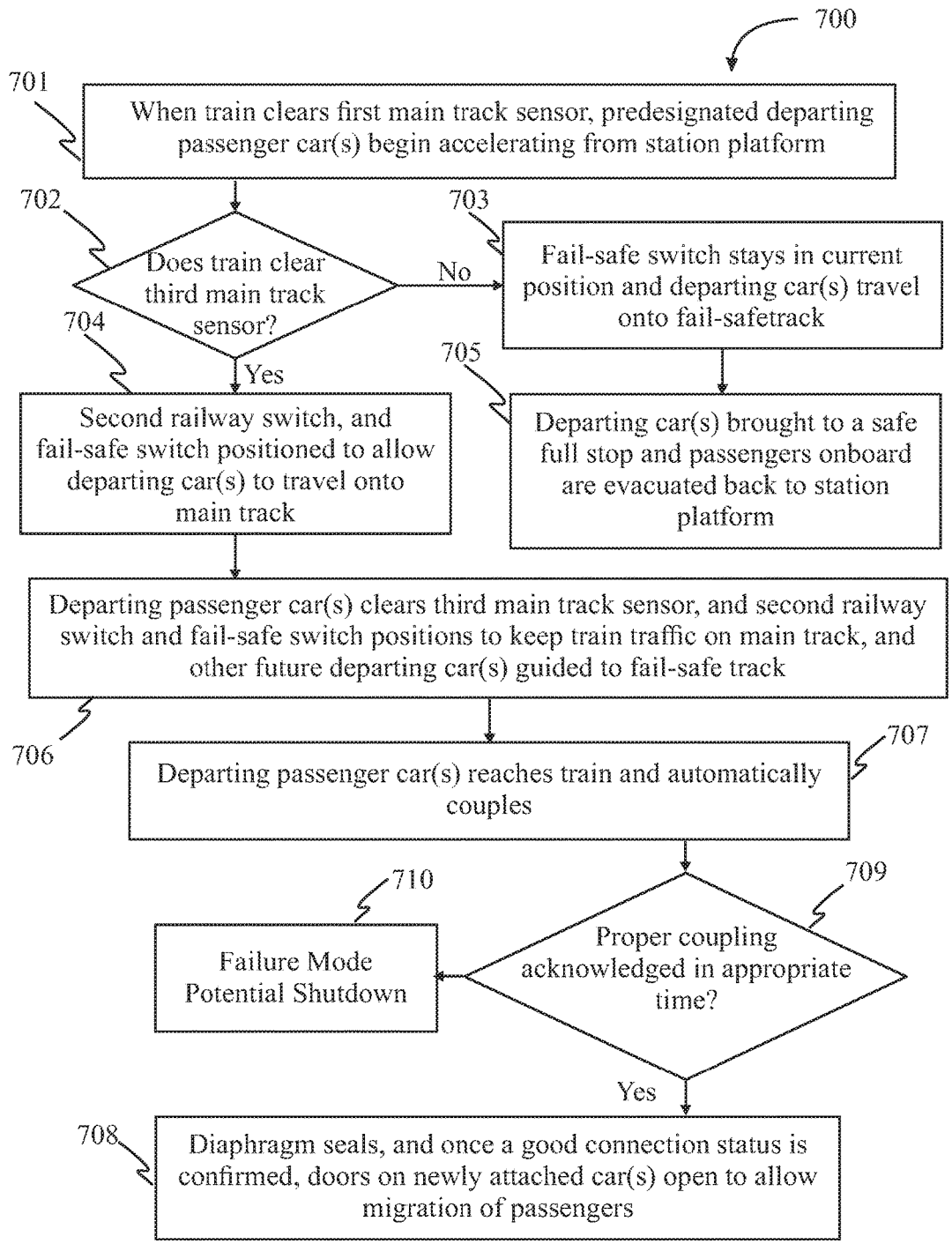
FIG. 7 is a flowchart that outlines a departing car deployment process according to one embodiment of the present invention.

FIG. 7 is a flowchart of a method 700 that describes a departing car deployment process according to one embodiment of the present invention. At step 701 the train clears the first main track sensor (this can be held off until the train clears the second main track sensor). Departing passenger cars begin to be accelerated by the electromagnetic rail system of the side track. At step 702, the third main track sensor may report to the central computer system whether the train has passed. If the train has not passed within a certain window of time, step 703 comes into effect. A fail-safe switch maintains its current position and guides one or more deploying cars onto a fail-safe track. At step 705, the one or more departing passenger cars are decelerated to a full stop by the electromagnetic rail system of the side track, and onboard passengers are evacuated. If the third main track sensor reports that the train has properly passed, step 704 occurs. At step 704 a second railway switch 131 and fail-safe railway switch 132 are positioned to allow one or more departing vehicles to travel onto the main track. At step 706, the one or more departing cars clears the third main track sensor, and the second railway switch and fail-safe railway switch return to their previous positions, which guides any future departing cars to the fail-safe track, while keeping train traffic on the main track.

It should be noted that real-time communication between the on-board and central computer systems, and feedback control is utilized to ensure that the departing passenger car achieves the correct speed at the right time to avoid the fail-safe system operation, which will only come into effect if, for some reason, the train traveling at a controlled speed on the main track is somehow delayed in clearing the third main track sensor.

At step 707, the one or more departing cars catch up to the train and automatically couple. Distance between the train and one or more departing cars may be determined with methods such as, but not limited to, use of proximity sensors, and global position tracking data recorded and analyzed by a central computer system. If the speed of the one or more departing cars as they close in to the train is determined to be unsafe, the central computer system may engage an emergency braking system present on every passenger car through wireless signals received by an onboard computer. The electromagnetic propulsion system used on side track 122 is also incorporated for some distance on the main track both before and after the side track switches, to manage car locomotion and deceleration for any car decoupling from the main train, and locomotion and acceleration for cars leaving a station and approaching a passing train to couple. If decoupling or coupling is not confirmed within a certain distance, this is flagged to the central computer to determine what to do next (system shutdown or some type of a work around).

At step 709 it is determined whether a proper coupling of the departing car was accomplished in a pre-determined time window. If yes, control passes to step 708.

At step 708, once the departing car or cars are safely coupled, a seal is formed by the diaphragm installed at the ends of every passenger car. Once a solid coupling connection is confirmed by the local onboard computer system of the one or more newly attached departing cars, passengers may move to other attached passenger cars.

If, at step 709, it is determined that the departing car did not properly couple to the train, then control passes to step 710, and an emergency mode is entered, which may result in the train being stopped, and steps taken to retrieve the departing car and its passengers.

Figure 8:
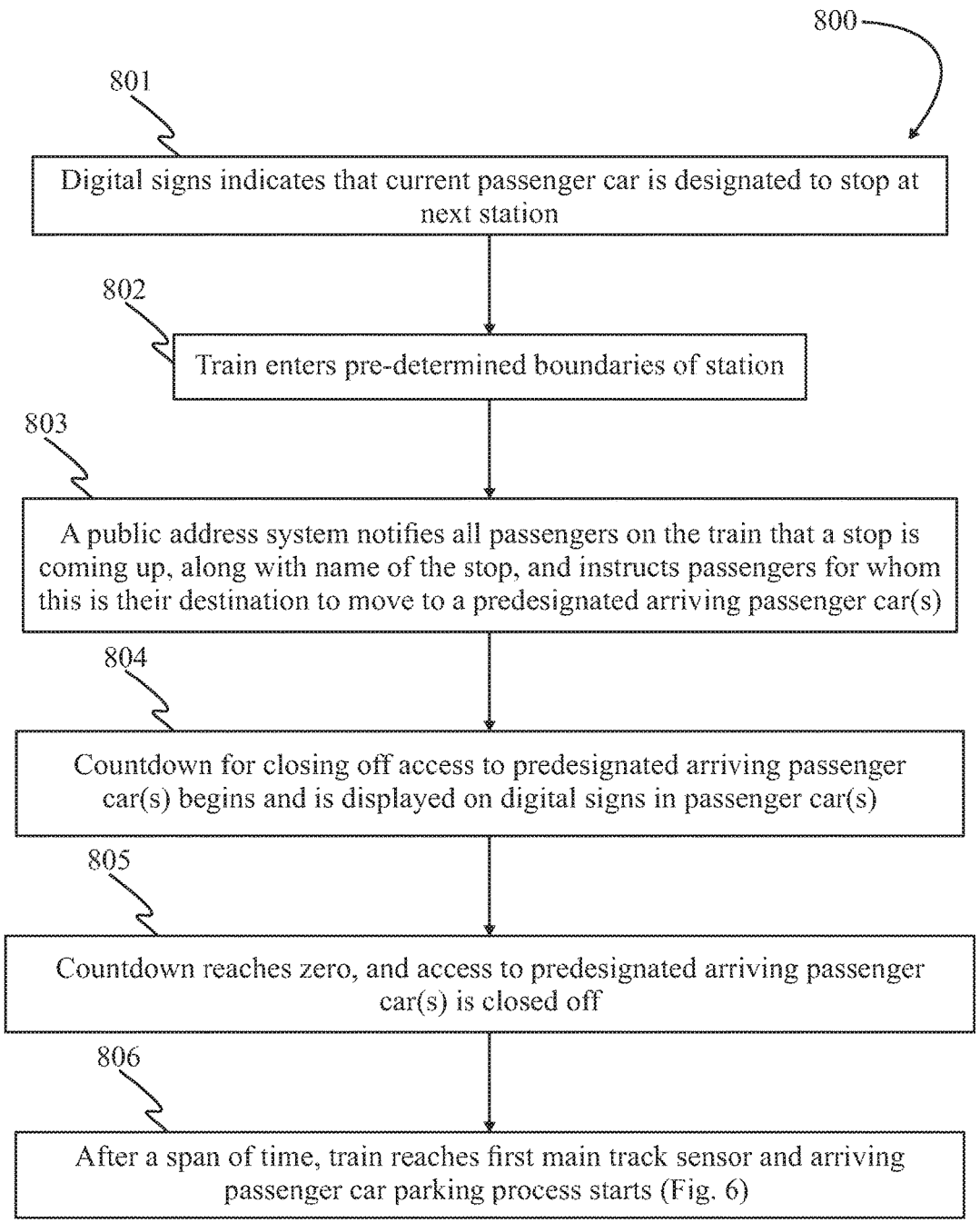
FIG. 8 is a flowchart that outlines the operation of an express train system from the perspective of the one or more arriving passenger cars according to one embodiment of the present invention.

FIG. 8 is a flowchart of a method 800 that outlines operation of an express train system from the perspective of the one or more arriving passenger cars according to one embodiment of the present invention. At step 801, if a passenger car becomes designated as an arriving car, digital signs in that car may display that information to passengers. The digital signs may include, but are not limited to, marquee style lights with the ability to display alphanumeric characters and symbols, a digital map with a list and indicator for each station present in a train system, and display screens, such as, but not limited to, monitors or television screens. At step 802, the train enters boundaries of an upcoming station. At step 803, a public announcement system announces to all onboard passengers that the next stop is coming up, and instructs passengers who wish to disembark at this station to move to one or more designated arriving cars located at the end of the train. At step 804, a countdown begins and is displayed on the digital displays. Undesignated cars may have displays that instructs passengers to move to a designated arriving car if they wish to stop at the upcoming station, while designated cars may have displays that indicates that the present car is designated as an arriving car. At step 805, the countdown reaches zero and access to the one or more designated arriving cars are closed, and the public address system may instruct passengers to be seated, or secure their positions. After a period of time, step 806 occurs. At step 806, the train reaches a first main track sensor (123), and the arriving car parking process outlined in FIG. 6 begins.

Figure 9:
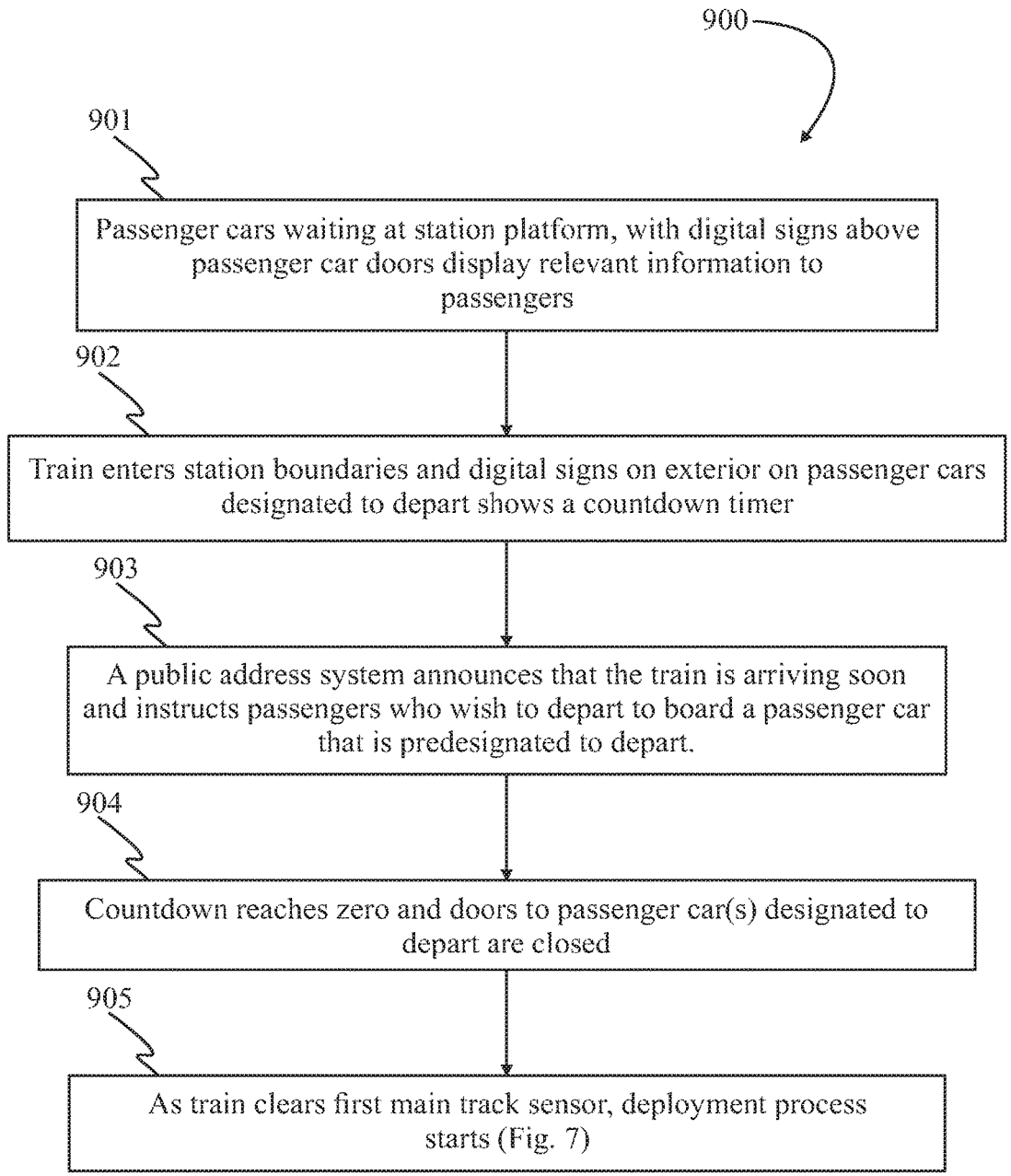
FIG. 9 is a flowchart that outlines the operation of an express train system from the perspective of a station platform according to one embodiment of the present invention.

FIG. 9 is a flowchart of a method 900 that outlines operation of an express train system from the perspective of a station platform according to one embodiment of the present invention. At step 901, passenger cars are waiting at station platform. Digital signs mounted on the exterior of each car display relevant information which may include, but is not limited to, number of passengers currently onboard that particular car, and whether that particular car has been designated for departure. At step 902 a train enters station boundaries, and the exterior digital displays may now display a countdown until access to one or more departing cars will be closed. At step 903, a station public address system announces that departure will be happening soon, and instructs passengers to board a predesignated departing car if they wish to depart on the next train. At step 904, countdown on digital displays on one or more departing cars reaches zero, and access to the one or more departing cars is closed-off. At step 905, as the train clears the first main track sensor, the one or more predesignated departing cars begin the deployment process of FIG. 7. (This action can also be held off until the train clears the second main track sensor.)

Figure 10:
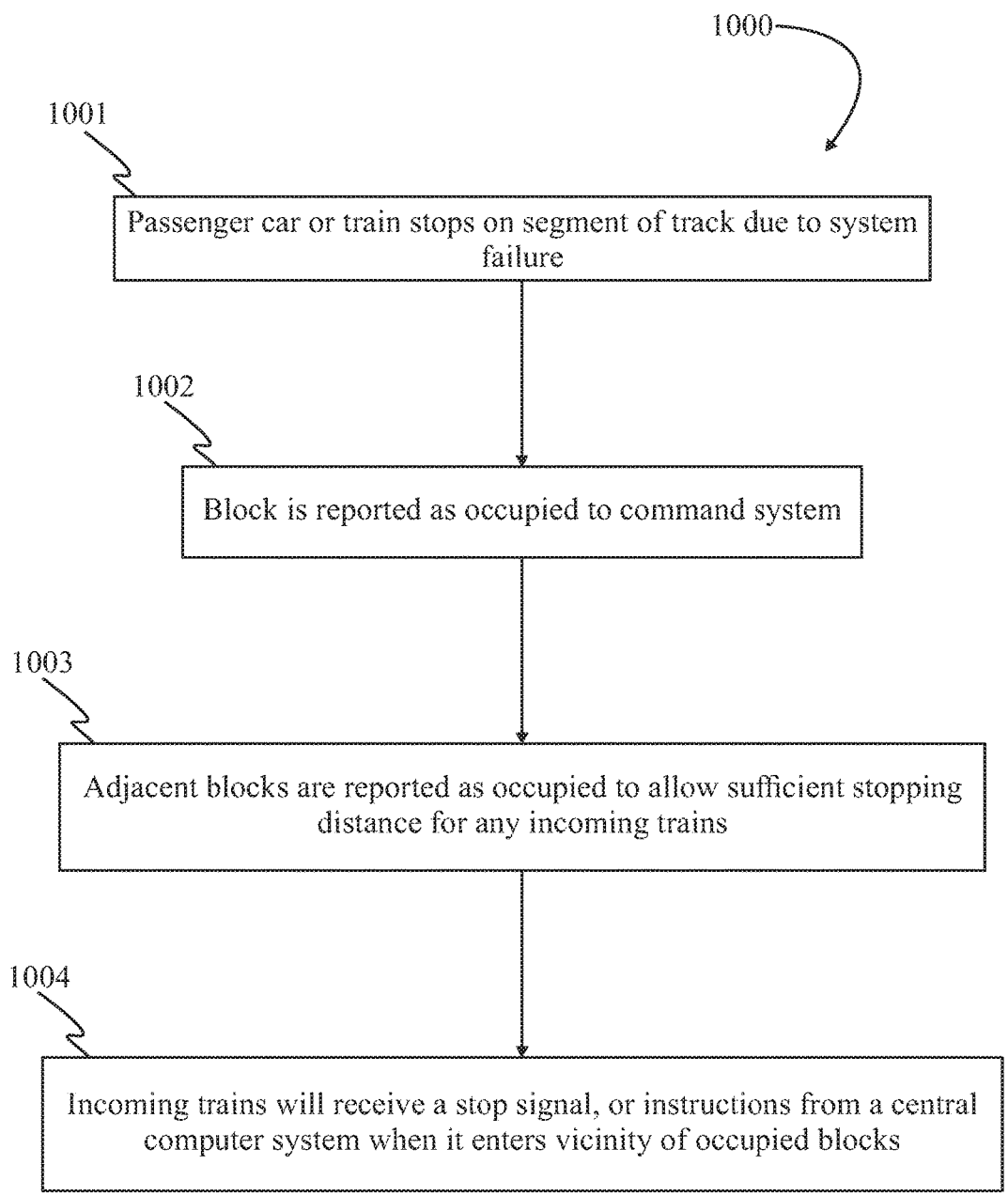
FIG. 10 is a flowchart that outlines how an emergency involving stopped cars on a main track is handled according to one embodiment of the present invention.

FIG. 10 is a flowchart of a method 1000 that outlines how an emergency involving stopped cars on a main track may be handled according to one embodiment of the present invention. This embodiment may implement an automatic block signaling system (ABS), in which lengths of tracks are divided into segments, referred to as blocks. These blocks are reported to a central computer system as occupied whether it is an emergency situation or not. For the purposes of this method, an emergency scenario involving vehicles stopped on one or more blocks will be used.

In step 1001, one or more passenger cars may have become decoupled due to system failure, or an entire train may have stopped due to system failure. In step 1002, the one of more blocks that are occupied with stopped vehicles are reported to the central computer system as occupied. In step 1003, blocks adjacent to the one or more blocks with the stopped vehicles are marked as occupied by the central computer system. In step 1004, any incoming trains will receive a stop signal, or instructions from the central computer system to an onboard computer system of an incoming to automatically brake before a collision occurs.

It will be apparent to one with skill in the art, that the embodiments described above are specific examples of a single broader invention which may have greater scope than any of the singular descriptions taught. There may be many alterations made in the descriptions without departing from the spirit and scope of the present invention.

The invention claimed is:

1. A train system, comprising:
   a first main track, passing each one of a plurality of geographically-separated passenger stations in a sequential order;
   a locomotive traveling at a controlled, pre-determined speed on the first main track;
   a plurality of passenger cars, each capable of individual locomotion and of automatic coupling and decoupling to other passenger cars and to the locomotive, each having passages that may be opened to allow passengers to move from car to car, and that may be closed to prevent passengers from moving from car to car, a portion of the plurality of passenger cars coupled to one another and to the locomotive, forming a train moving at the controlled, pre-determined speed on the first main track;
   side tracks at each passenger station joined to the main track by a first remotely-operable switch before and by a second remotely-operable switch after the associated passenger station, the side tracks each having a load/unload region at the associated passenger station; and
   a central computer system tracking the locomotive and all passenger cars, remotely switching the first and second remotely-operable switches at each passenger station, and managing locomotion of each passenger car while decoupled from the train;
   wherein the central computer system operates the first and second switches of a side track at a passenger station, decouples a last car of the train ahead of each passenger station and operates the first remotely operable switch to shunt the decoupled car onto the side track, resets the first switch after the decoupled car is on the side track, closes and accelerates a newly-loaded car from the load/unload region onto the main track after the train has passed the second switch, by operating the second switch, manages locomotion of the newly loaded car to join the train by coupling to the last car of the train, and manages locomotion of the decoupled car to decelerate gradually and stop at the load/unload station.

2. The train system of claim 1 further comprising a series of sensors located both on the main track both before and after the station, and at various points on the side track, the sensors noting position of trains and cars, and transmitting information to the central computer system.

3. The train system of claim 1 wherein the first main track makes a loop, passing each of the plurality of separated passenger stations in the loop, and repeating the loop.

4. The train system of claim 3 comprising two main tracks making a loop within a loop, with each main track having a side track at each passenger station.

5. The train system of claim 1 wherein the main computer system manages passenger guidance displayed both inside and outside each passenger car, depending upon the position and deployment of each car.

6. The train system of claim 5 wherein passengers are guided by announcements and displays inside cars coupled to a moving train to move to correct cars designated for arrival at the station of their desired destinations.

7. The train system of claim 6 wherein cars designated as arriving cars for an approaching station are closed to passenger movement between cars at some predetermined distance from the arriving station.

8. The train system of claim 6 wherein passengers at a station are guided by displays on cars designated for departure and by announcements of what cars to enter and at what time.

9. The train system of claim 8 wherein cars designated for departure are closed for passenger entry at a pre-determined time based on position of a train passing the station on the main track.

10. The train system of claim 1 wherein a fail-safe switch is positioned on the side track between the station loading platform and the switch entering the main track, and the fail-safe switch switches a departing car onto a fail-safe track to be safely decelerated in the event that a train has not passed the station at a pre-determined time.

* * * * *